United States Patent
Sato (10) Patent No.: US 9,131,180 B2
(45) Date of Patent: Sep. 8, 2015

(54) METHOD AND APPARATUS FOR AUTOMATICALLY GROUPING DOCUMENTS FOR AGGREGATE PRINTING

(71) Applicant: KYOCERA Document Solutions Inc., Osaka-shi (JP)

(72) Inventor: Masaoki Sato, Osaka (JP)

(73) Assignee: KYOCERA DOCUMENT SOLUTIONS INC., Osaka-Shi (JP)

( * ) Notice: Subject to any disclaimer, the term of this patent is extended or adjusted under 35 U.S.C. 154(b) by 2 days.

(21) Appl. No.: 13/870,347

(22) Filed: Apr. 25, 2013

(65) Prior Publication Data

US 2013/0286438 A1 Oct. 31, 2013

(30) Foreign Application Priority Data

Apr. 27, 2012 (JP) ................. 2012-102628

(51) Int. Cl.
*G06K 15/00* (2006.01)
*H04N 1/387* (2006.01)

(52) U.S. Cl.
CPC ............. *H04N 1/387* (2013.01); *H04N 1/3875* (2013.01)

(58) Field of Classification Search
CPC .... G06F 3/1205; G06F 3/125; G09G 2340/04
USPC ............. 358/1.18, 1.12, 1.13, 1.14, 1.15, 1.2, 358/452; 101/483; 399/85; 705/408; 715/234
See application file for complete search history.

(56) References Cited

U.S. PATENT DOCUMENTS

| | | | |
|---|---|---|---|
| 6,222,634 B1* | 4/2001 | Dubbels et al. | 358/1.15 |
| 6,667,814 B1* | 12/2003 | Tillotson | 358/1.15 |
| 2004/0068698 A1* | 4/2004 | Wu et al. | 715/525 |
| 2005/0046899 A1* | 3/2005 | Matsuda et al. | 358/1.18 |
| 2005/0080770 A1* | 4/2005 | Lueder et al. | 707/3 |
| 2005/0246324 A1* | 11/2005 | Paalasmaa et al. | 707/3 |
| 2005/0248811 A1* | 11/2005 | Nakagiri et al. | 358/1.18 |
| 2007/0260613 A1* | 11/2007 | Ippili et al. | 707/100 |
| 2008/0313561 A1* | 12/2008 | Tsao et al. | 715/810 |
| 2009/0070366 A1* | 3/2009 | Zhao et al. | 707/102 |
| 2009/0086939 A1* | 4/2009 | Chatterjee | 379/93.03 |
| 2011/0242601 A1* | 10/2011 | Takahashi | 358/1.15 |
| 2011/0286034 A1* | 11/2011 | Hirano | 358/1.15 |
| 2012/0092705 A1* | 4/2012 | Min et al. | 358/1.15 |
| 2012/0320409 A1* | 12/2012 | Kakegawa | 358/1.15 |

FOREIGN PATENT DOCUMENTS

JP 11-216926 A 8/1999

* cited by examiner

*Primary Examiner* — David S Cammack
(74) *Attorney, Agent, or Firm* — Knobbe Martens Olson & Bear LLP (57) ABSTRACT

The present disclosure includes a document data storing unit 6 that stores a plurality of document data together with an attribute, an aggregate condition storing unit 7 that stores an aggregate condition defining the aggregate attribute, and an aggregate processing unit 5. The aggregate processing unit 5 configures the document data to be aggregated into a document group from the selected plurality of document data based on the aggregate condition, and executes aggregate printing of the document data in the document group as a single group of continuous print data.

12 Claims, 10 Drawing Sheets

| NAME | DATE/TIME OF RECEIPT | AGGREGATE | URL | PAGE NUMBER |
|---|---|---|---|---|
| DOCUMENT 1 | 2012.04.25.15:20:23 | 4in1 | http://www.aaa/bbb/ccc/ddd/eee/fff.html | 3 |
| DOCUMENT 2 | 2012.04.25.15:25:15 | 2in1 | http://www.aaa | 2 |
| DOCUMENT 3 | 2010.04.26.09:10:30 | 4in1 | http://www.aaa/bbb/lll.html | 2 |
| DOCUMENT 4 | 2012.04.26.09:12:45 | 4in1 | http://www.aaa/bbb/ccc/ggg/jjj.html | 5 |
| DOCUMENT 5 | 2012.04.26.10:01:20 | 2in1 | http://www.aaa/bbb/kkk.html | 3 |
| DOCUMENT 6 | 2012.04.26.10:05:24 | 4in1 | http://www.aaa/bbb/ccc/ddd/eee/iii.html | 3 |
| DOCUMENT 7 | 2012.04.26.10:09:11 | 2in1 | http://www.aaa/bbb/ccc/ggg/hhh.html | 1 |

NORMAL PRINTING

AGGREGATE PRINTING

AGGREGATE CONDITION

1. ASSOCIATION EXISTS WHEN ANY HIERARCHY UNTIL [ 3 ] LEVELS [ UP ] IS IDENTICAL WHEN VIEWED FROM DOCUMENT'S SELF

2. ASSOCIATION EXISTS WHEN DOCUMENTS ARE AT THE SAME HIERARCHY

3. EXCLUDE [ FIRST ] HIERARCHY IN DETERMINATION

4. ASSOCIATION EXISTS WHEN DOCUMENTS ARE IN PARENT-CHILD RELATIONSHIP

DETAIL SETTING

DETERMINE

FIG. 8

| NAME | DATE/TIME OF RECEIPT | AGGREGATE | U R L | PAGE NUMBER |
|---|---|---|---|---|
| DOCUMENT 1 | 2012.04.25.15:20:23 | 4in1 | http://www.aaa/bbb/ccc/ddd/eee/fff.html | 3 |
| DOCUMENT 6 | 2012.04.26.10:05:24 | 4in1 | http://www.aaa/bbb/ccc/ddd/eee/iii.html | 3 |
| DOCUMENT 4 | 2012.04.26.09:12:45 | 4in1 | http://www.aaa/bbb/ccc/ggg/jjj.html | 5 |
| DOCUMENT 7 | 2012.04.26.10:09:11 | 2in1 | http://www.aaa/bbb/ccc/ggg/hhh.html | 1 |
| DOCUMENT 3 | 2010.04.26.09:10:30 | 4in1 | http://www.aaa/bbb/lll.html | 2 |
| DOCUMENT 5 | 2012.04.26.10:01:20 | 2in1 | http://www.aaa/bbb/kkk.html | 3 |
| DOCUMENT 2 | 2012.04.25.15:25:15 | 2in1 | http://www.aaa | 2 |

FIG. 9

| FIRST DOCUMENT GROUP | SECOND DOCUMENT GROUP | THIRD DOCUMENT GROUP | FOURTH DOCUMENT GROUP |
|---|---|---|---|
| DOCUMENT 1 | DOCUMENT 4 | DOCUMENT 3 | DOCUMENT 2 |
| DOCUMENT 6 | DOCUMENT 7 | DOCUMENT 5 | |

FIG. 10

METHOD AND APPARATUS FOR AUTOMATICALLY GROUPING DOCUMENTS FOR AGGREGATE PRINTING

INCORPORATION BY REFERENCE

This application is based upon and claims the benefit of priority from the corresponding Japanese Patent Application No. 2012-102628, filed in the Japan Patent Office on Apr. 27, 2012, the entire contents of which are incorporated herein by reference.

BACKGROUND

The present disclosure relates to an image forming apparatus that includes an aggregate printing function configured to print a plurality of pages of document data on a single sheet of recording medium.

Many image forming apparatuses such as copying machines or multifunctional peripherals include an aggregate printing function that is configured to print a plurality of pages of document data on a single sheet of recording medium. Such aggregate printing enables economizing the number of sheets of recording media. However when a number of pages to be printed on a single sheet of recording medium exhibits a poor balance with a number of pages of document data, an unnecessary blank page may result on a sheet of recording medium on which the final page of document data is printed. In this context, there is a technique of minimizing the formation of an unnecessary blank page by performing aggregate printing in which a plurality of selected document data is collected as a single group of continuous print data.

However, the conventional technique requires a user to select a plurality of document data to be collected as a single group of continuous print data. As a result, when printing a large amount of document data, a problem has arisen that since a user must determine whether to collect respective document data into a single group of continuous print data, it is necessary for the user to perform complicated operations.

SUMMARY

In an aspect of the present disclosure, an image forming apparatus is provided, which has an aggregate printing function configured to print a plurality of pages of document data on a single sheet of recording medium and which includes a document data storing unit, an aggregate condition storing unit, and an aggregate processing unit. The document data storing unit is configured to store a plurality of document data together with an attribute thereof. The aggregate condition storing unit is configured to store an aggregate condition that defines the aggregate attribute. The aggregate processing unit is configured to extract document data to be aggregated as a document group from a plurality of selected document data based on the aggregate condition, and to execute aggregate printing of the document data in the document group as a single group of continuous print data.

DETAILED DESCRIPTION

Embodiments of the present disclosure will now be described in detail with reference to the figures. An image forming apparatus according to an embodiment of the present disclosure is a multifunction peripheral 100 that includes a copying function, printing function, scanning function, and the like. Making reference to FIG. 1, the multifunction peripheral 100 includes a document scanning unit 120, a document feeding unit 130, and a recording unit 140. The document scanning unit 120 is disposed at an upper portion of the recording unit 140. The document feeding unit 130 is disposed at an upper portion of the document scanning unit 120. An operation panel 10, through which an operational instruction or setting of the multifunctional peripheral 100 is performed, is disposed on a front side of the multifunctional peripheral 100.

Figure 2:
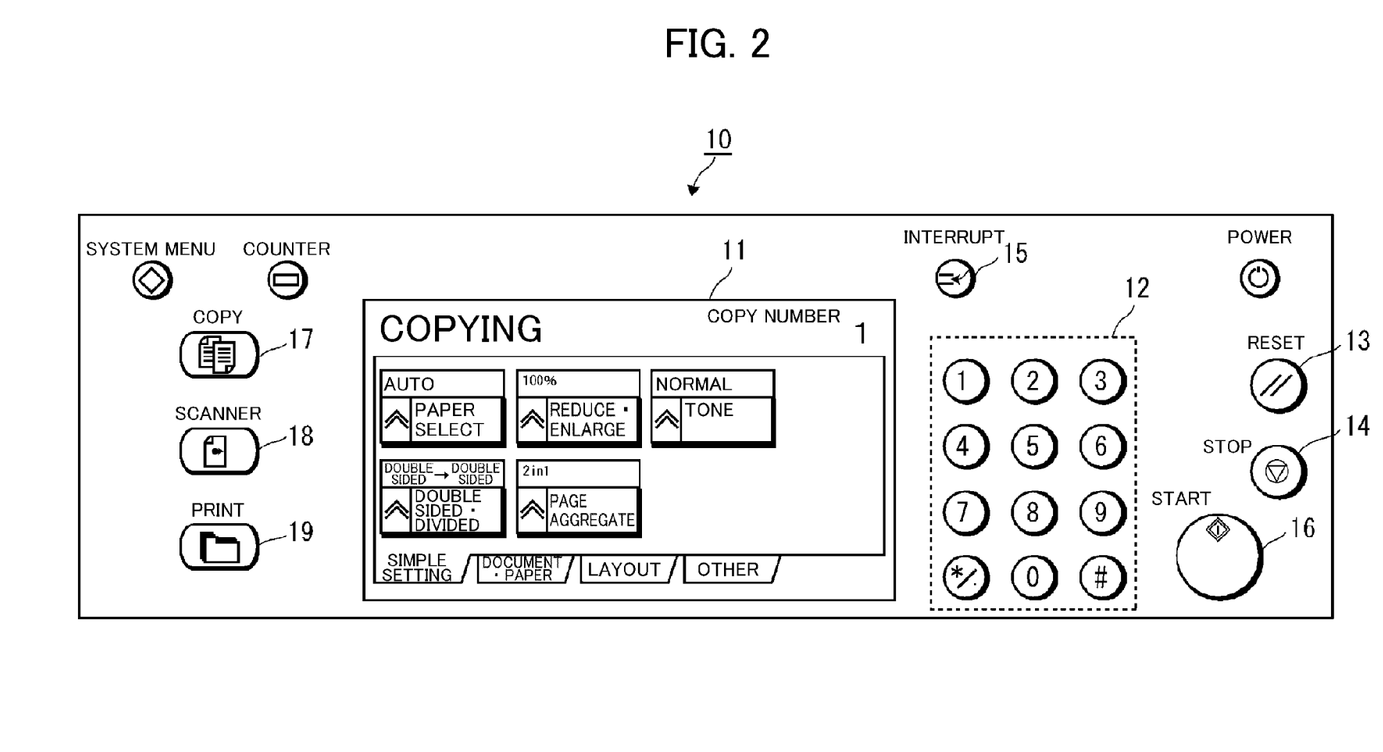
FIG. 2 is a plan view illustrating an example of a configuration of an operation panel illustrated in FIG. 1.

With reference to FIG. 2, the operational panel 10 includes a touch panel 11, and various operational keys such as a numerical key pad 12 configured to enable input of a number such as a printing sheet number or the like, a reset key 13, a stop key 14, an interrupt key 15 configured to instruct a copying interrupt, and a start key 16. The touch panel 11 is configured to include a transparent pressure sensitive sensor on a surface of a liquid-crystal display panel. The reset key 13 is a key configured to enable input of an instruction to initialize set information. The stop key 14 is a key configured to enable deleting of an input number or stopping of a copying operation. The start key 16 is a key configured to enable input of an output instruction to start a printing operation.

The operation panel 10 includes mode switching keys such as a copying key 17 configured to instruct a copying function, a scanner key 18 configured to instruct a scanner function, and a printing key 19 configured to instruct a printing function. An operational screen corresponding to a function mode that is instructed by each mode switching key is displayed on the touch panel 11. The copying function represents a mode in which image data of a document MS read by the document scanning unit 120 is printed onto a sheet of recording paper P by the recording unit 140. The scanner function represents a mode in which image data of the document MS read by the document scanning unit 120 is stored in a storing unit, and sent through a network (facsimile transmission or the like). The printing function represents a mode in which the image data stored in the storing unit is printed onto a sheet of recording paper P by the recording unit 140.

Figure 1:
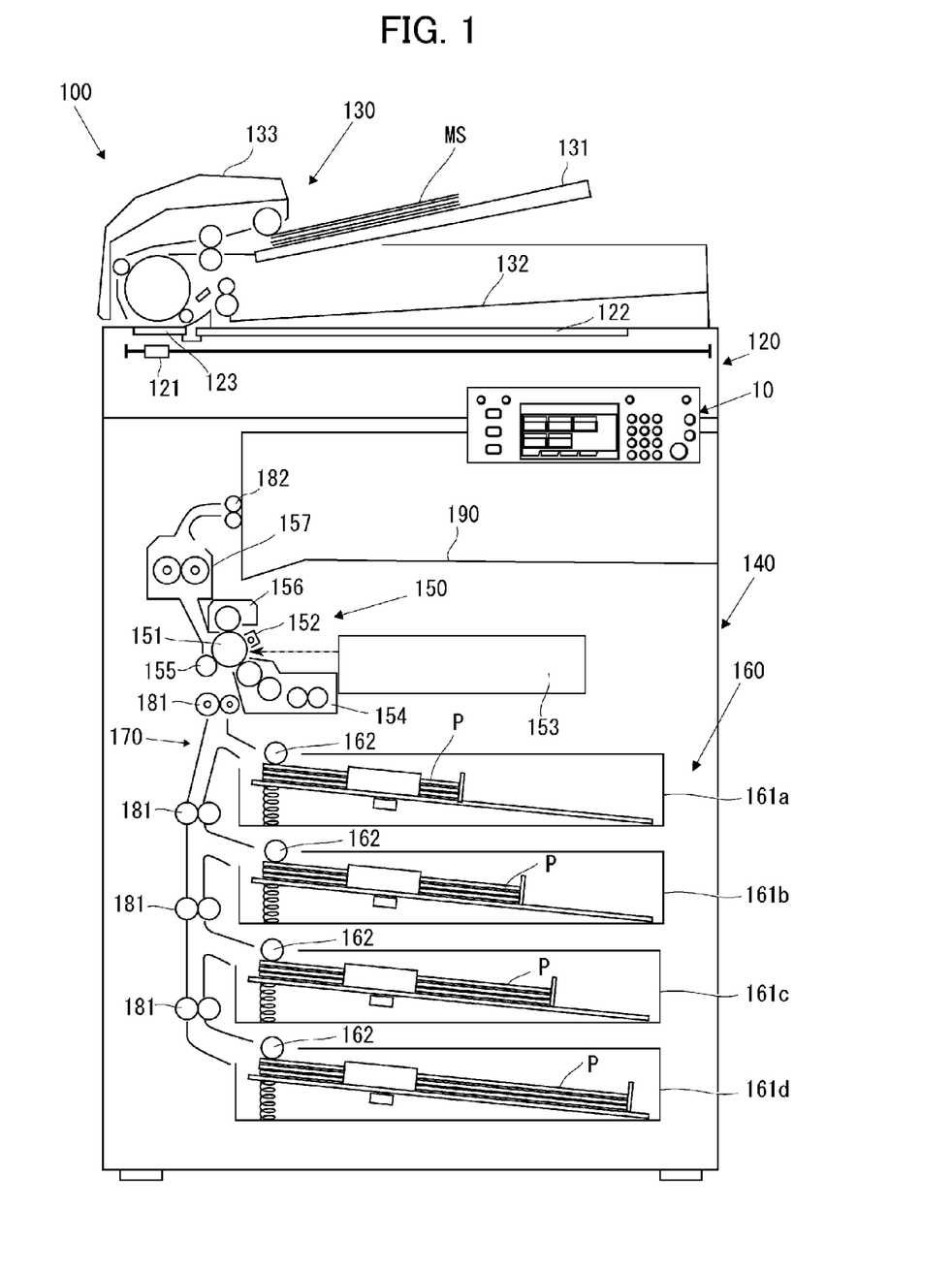
FIG. 1 is a schematic figure illustrating an example of a configuration of an image forming apparatus according to an embodiment of the present disclosure.

Making reference now to FIG. 1, the document scanning unit 120 includes a scanner 121, a platen glass 122, and a document scanning slit 123. The scanner 121 includes an exposure lamp and a Charge Coupled Device (CCD) sensor, and is movable with respect to a direction of conveying a document MS by the document feeding unit 130. The platen glass 122 is a document pedestal made of a transparent material such as glass. The document scanning slit 123 includes a slit that is formed in a direction orthogonal to the direction of conveying a document MS by the document feeding unit 130.

When a document MS placed on the platen glass 122 is read, the scanner 121 moves to a position corresponding to the platen glass 122 and reads the document MS while scanning the document MS placed on the platen glass 122, thereby acquiring image data. When a document MS that is conveyed by the document feeding unit 130 is read, the scanner 121 moves to a position corresponding to the document scanning slit 123 and reads the document MS through the document scanning slit 123 synchronously with conveying operation of the document MS performed by the document feeding unit 130, thereby acquiring image data.

The document feeding unit 130 includes a document placing unit 131, a document discharging unit 132, and a document conveying mechanism 133. Documents MS placed on the document placing unit 131 are fed one by one in series by the document conveying mechanism 133, conveyed to a position corresponding to the document scanning slit 123 of the document scanning unit 120, and thereafter, discharged to the document discharging unit 132. The document feeding unit 130 is openable and closable in relation to the document scanning unit 120. When a user lifts the document feeding unit 130, an upper surface of the glass platen 122 is exposed.

The recording unit 140 includes an image forming unit 150, a sheet feeding unit 160, a conveying path 170, a conveying roller 181, a discharge roller 182, and an in-body paper discharge tray 190 provided in an in-body discharge cavity of the multifunction peripheral 100.

The sheet feeding unit 160 includes a plurality of sheet feeding cassettes 161a to 161d for storing sheets of recording paper P, and a sheet feed roller 162. The sheet feed roller 162 feeds out the sheets of recording paper P one by one from the sheet feed cassettes 161a-161d to the conveying path 170. The sheet feed roller 162, the conveying roller 181 and the discharge roller 182 function as a conveying unit that is configured to convey a sheet of recording paper P. The sheet of recording paper P fed out to the conveying path 170 by the sheet feed roller 162 is conveyed to the image forming unit 150 by the conveying roller 181. The sheet of recording paper P subjected to recording by the image forming unit 150 is guided by the discharge roller 182 and delivered as a print product to the in-body paper discharge tray 190. In the present embodiment, four paper feed cassettes 161a to 161d are provided.

The image forming unit 150 includes a photosensitive drum 151, a charging unit 152, an exposing unit 153, a developing unit 154, a transfer unit 155, a cleaning unit 156, and a fixing unit 157. The exposing unit 153 is an optical unit including a laser device, a mirror, or the like. The exposing unit 153 outputs laser light based on image data to expose the photosensitive drum 151 charged by the charging unit 152, thereby forming an electrostatic latent image on a surface of the photosensitive drum 151. The developing unit 154 is configured to develop the electrostatic latent image formed on the photosensitive drum 151. The developing unit 154 forms a toner image on the photosensitive drum 151 with reference to the electrostatic latent image. The transfer unit 155 transfers the toner image formed on the photosensitive drum 151 by the developing unit 154 onto a sheet of recording paper P. The fixing unit 157 heats the sheet of recording paper P onto which the toner image has been transferred by the transfer unit 155, such that it fixes the toner image onto the sheet of recording paper P.

Figure 3:
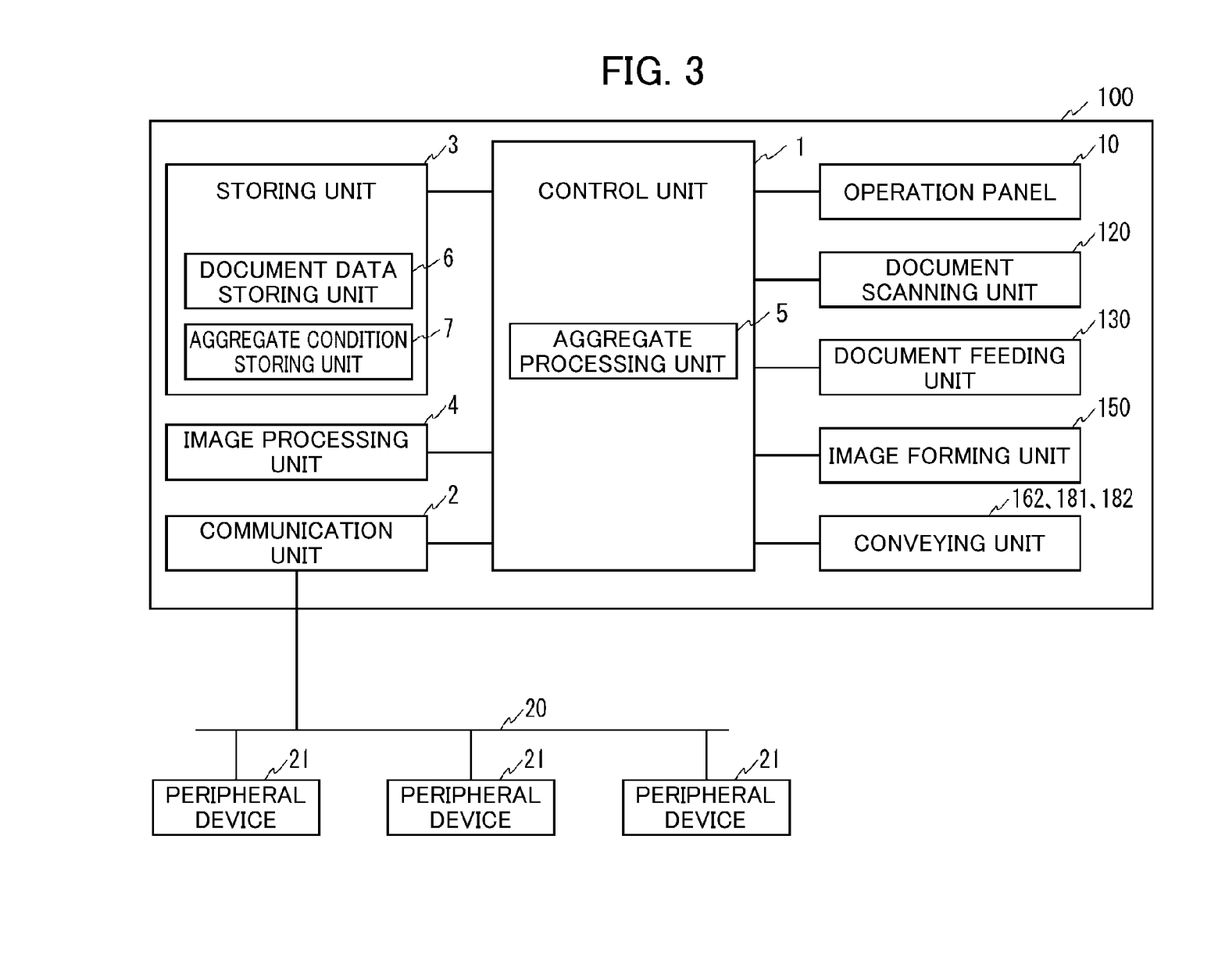
FIG. 3 is a block diagram illustrating a schematic configuration of the image forming apparatus according to the embodiment of the present disclosure.

Next, an example of a hardware configuration for the multifunctional peripheral 100 will be described with reference to FIG. 3. The operation panel 10, the document scanning unit 120, the document feeding unit 130, the image forming unit 150 and the conveying unit (sheet feed roller 162, conveying roller 181, discharge roller 182) of the multifunctional peripheral 100 are connected to a control unit 1. The control unit 1 controls operation of these components. A communication unit 2, a storing unit 3 and an image processing unit 4 are connected to the control unit 1.

The communication unit 2 is an interface with a network 20 such as a LAN, and has a function of sending and receiving various types of data with a peripheral device 21 such as a personal computer or the like through the network. The communication unit 2 receives a set of document data and an attribute thereof from the peripheral device 21 through the network 20.

The storing unit 3 is a storing means configured to store image data acquired by reading a document by the document scanning unit 120, and for example is a semiconductor memory, a hard disk drive (HDD), or the like. The storing unit 3 functions as a document data storing unit 6 and an aggregate condition storing unit 7 configured to store an aggregate condition. The document data storing unit 6 stores the set of the document data and the attribute thereof received from the peripheral device 21 through the network 20.

The control unit 1 is an information processing unit such as a microcomputer or the like including a Read Only Memory (ROM), a Random Access Memory (RAM), or the like. A control program is stored in the ROM in order to control the operation of the multifunctional peripheral 100. The control unit 1 reads the control program stored in the ROM and deploys the control program into the RAM and controls the overall apparatus in response to predetermined instruction information that is entered through the operation panel 10. Furthermore, when aggregate printing is instructed from the operation panel 10, the control unit 1 functions as an aggregate processing unit 5 that is configured to execute an aggregate printing process to print a plurality of pages of document data on a single sheet of recording paper P.

Figure 4:
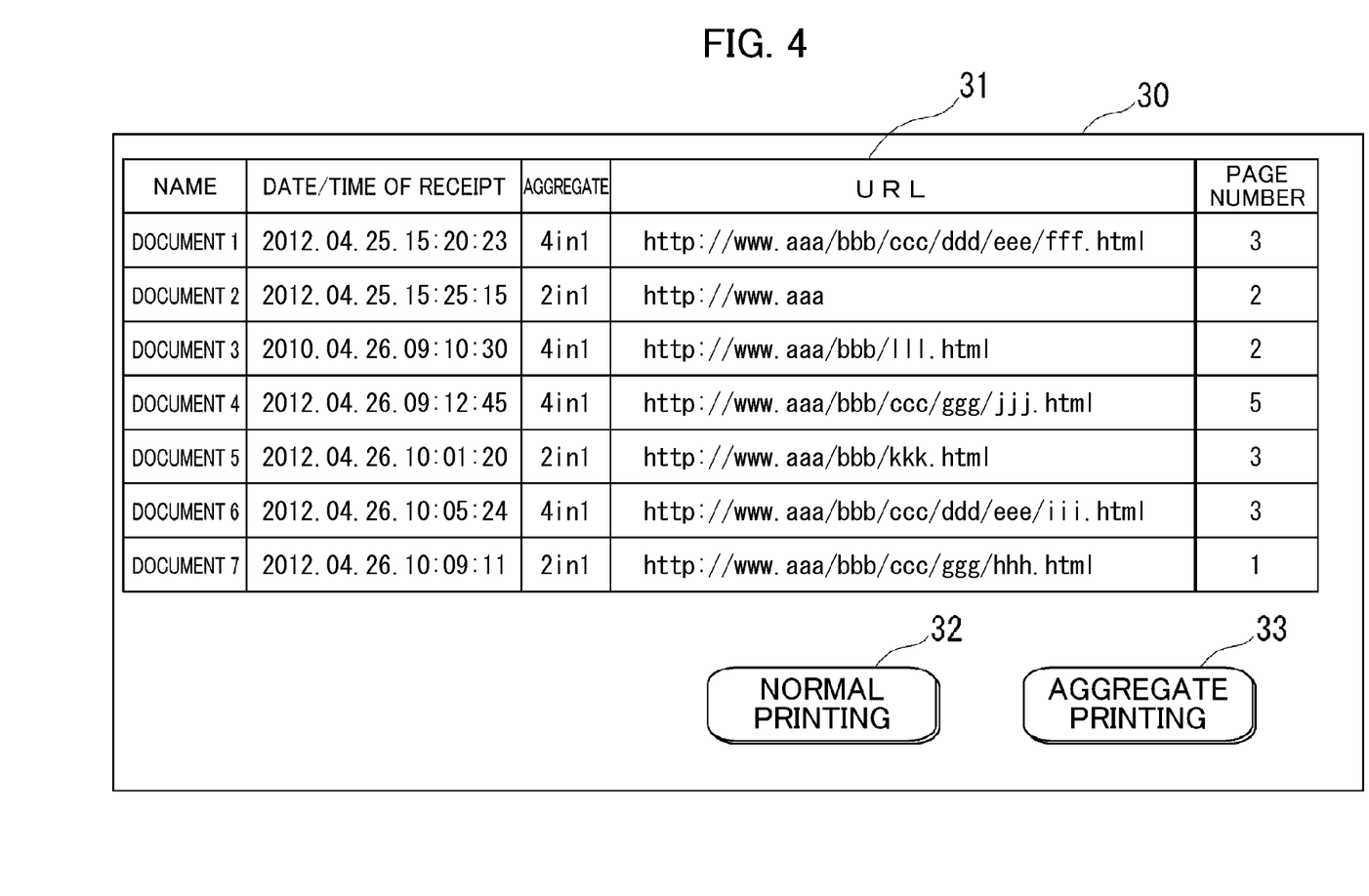
FIG. 4 illustrates an example of a printing instruction screen displayed on a touch panel illustrated in FIG. 2.

FIG. 4 illustrates an example in which the attribute of the document data stored in the document data storing unit 6 is displayed as a document data list 31 on a printing instruction screen 30 that is configured to instruct printing of the document data. The attribute of the document data is sent by a printer driver of the peripheral device 21. In the present embodiment, as illustrated in FIG. 4, attributes of the document data are received that include a "name" of a document data, an "aggregate" designating a printing configuration during aggregate printing, a "URL" indicating a hierarchy of document data, and a "page number" of printing data, together with document data from the peripheral device 21. The received document data is stored in the document data storing unit 6 in order of "date/time of receipt". The "aggregate" represents the designation of a page number of the document data to be printed on a single sheet of recording paper P during aggregate printing. "2 in 1" indicates a printing configuration for printing of two pages of document data on a single sheet of recording paper P. "4 in 1" indicates a printing configuration for printing of four pages of document data on a single sheet of recording paper P.

Figure 5A:
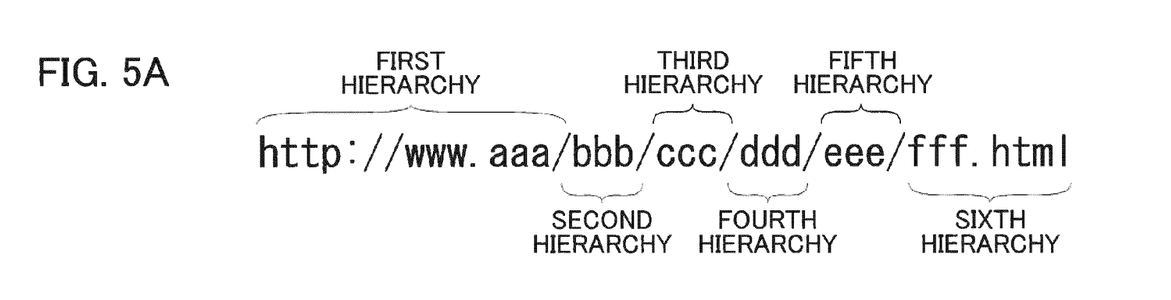
FIG. 5A and FIG. 5B describe a hierarchical structure of a URL in a document data list illustrated in FIG. 4.
Figure 5B:
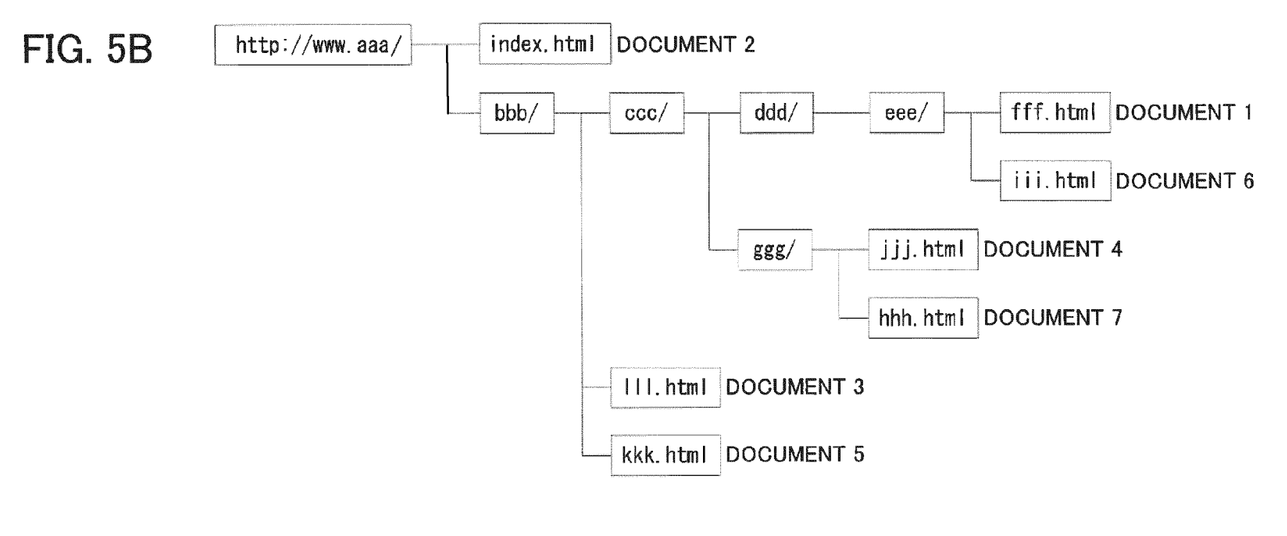

The Uniform Resource Locator (URL) is a notation configured to specify a location on the internet at which document data is stored, and has a hierarchical structure as illustrated in FIG. 5A. The "URL" illustrated in FIG. 5A corresponds to "document 1" in the document data list 31 illustrated in FIG. 4, and is composed of first to sixth hierarchy. FIG. 5B collectively illustrates hierarchical structure of "document 1" to "document 7" of the document data list 31 illustrated in FIG. 4.

The "document 1" to "document 7" of the document data list 31 illustrated in FIG. 4 are data collected by the peripheral device 21 on the internet. The "URL" is sent as an attribute of the document data by a printer driver of the peripheral device 21 when the data is collected. The present embodiment is configured to receive the "URL" indicating the location on the internet at which the document data is stored as an attribute of the document data, and to cause the document data storing unit 6 to store the "URL". However, the hierarchical structure indicating the location at which the document data is stored may for example be a folder structure or the like in the peripheral device 21.

Figure 6:
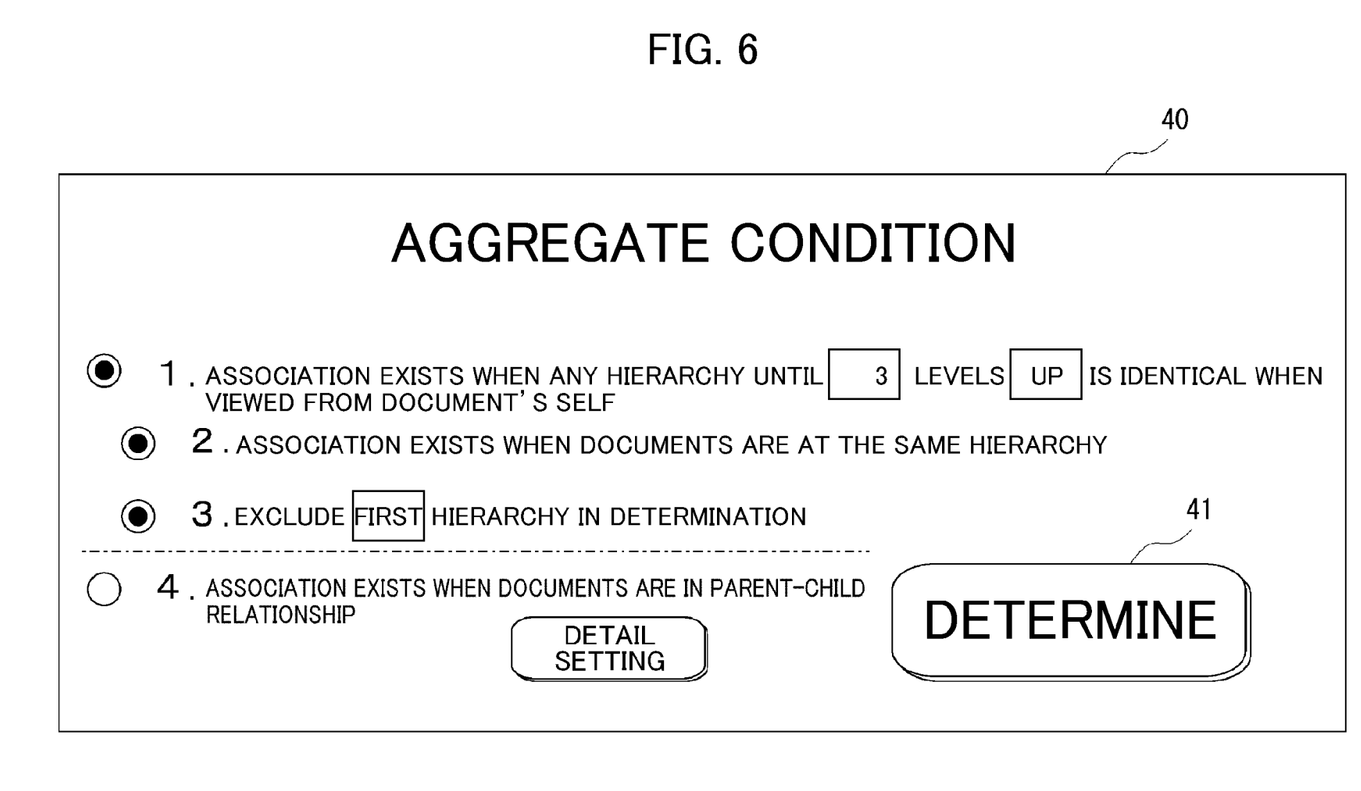
FIG. 6 illustrates an example of an aggregate condition setting screen displayed on a touch panel illustrated in FIG. 2.

An aggregate condition stored in the aggregate condition storing unit 7 is information for defining the association between document data. A plurality of data, which satisfies the aggregate condition and is determined to be associated with each other, is subjected to aggregate printing as a single continuous group of printing data. The aggregate processing unit 5 causes the touch panel 11 of the operation panel 10 to display the aggregate condition setting screen 40 as illustrated in FIG. 6, and receives setting for the aggregate condition from a user. When the user operates a laid-out determining button 41, the set aggregate condition is stored in the aggregate conditions storing unit 7.

Items 1 to 3 in the aggregate condition setting screen 40 as illustrated in FIG. 6 are the aggregate condition that defines the association based on the "URL" in the attributes of the document data. Item 1 is a mandatory item, and items 2 and 3 are optional items. In addition, item 1 is configured to determine an association with reference to a hierarchical character string, and enables setting of the number of levels and the direction (upper level or lower level) as a range of the levels for comparison of the character string. Item 2 is configured to determine an association based on a hierarchical level. Item 3 is configured to set a hierarchical level that is not included in the determination of association.

In the aggregate condition setting screen 40 as illustrated in FIG. 6, item 4 is an aggregate condition configured to define an association based on the determination of a parent-child relationship, which is performed by existing Web page monitoring software or the like. A user can operate a detail setting button to set the definition of a parent-child relationship about item 4, or a range of a hierarchical level to be considered in determining the parent-child relationship. The determination may be performed based on the number of hierarchies and a direction as the character string (folder name or the like) and the range of hierarchies in a folder structure instead of determining the association based on the "URL", when the folder structure in the peripheral device 21 in which the document data is stored is received as the attribute of the document data in substitution of receiving the "URL" indicating the location on the internet at which the document data is stored as the attribute of the document data.

The image processing unit 4 performs the predetermined image processing for the image data. For example, the image processing unit 4 includes enlarging/reducing processing and image improvement processing such as tone adjustment and contrast adjustment. The image processing unit 4 includes a graphical function configured to generate a break in a ruled line on a boundary with a plurality of the document data, when the aggregate printing processing is executed by the aggregate processing unit 5 and the plurality of document data is recorded on a single sheet of recording paper P.

Aggregate printing processing by the aggregate processing unit 5 according to the present embodiment will be described in detail making reference to FIG. 7 to FIG. 10. When the printing key 19 is operated on the operation panel 10 to instruct the printing function, the control unit 1 causes the touch panel 11 to display the printing instruction screen 30 that displays the document data list 31 for document data that is stored in the document data storing unit 6, and receives the selection of the document data (step A1). FIG. 4 illustrates the configuration in which 7 items of document data being "document 1" to "document 7" are selected in relation to the document data list 31 on the printing instruction screen 30. The layout of the printing instruction screen 30 includes a normal printing button 32 and an aggregate printing button 33 as printing instruction buttons configured to instruct printing of selected document data.

Figure 7:
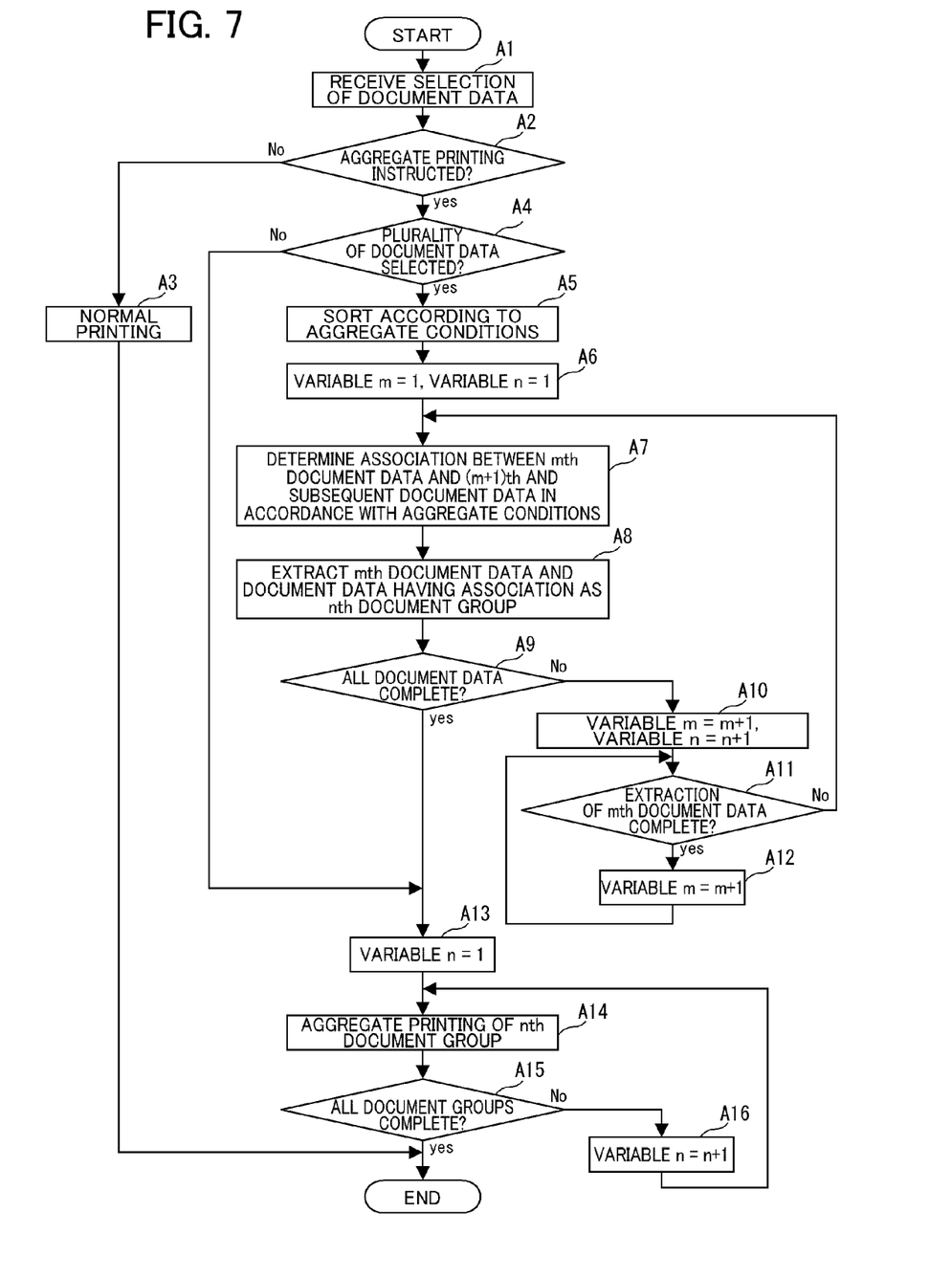
FIG. 7 is a flowchart describing an aggregate printing process in an aggregate processing unit illustrated in FIG. 3.

Next, the control unit 1 receives the operation that instructs printing of the selected document data, and determines whether the received operation is an operation of the aggregate printing button 33 (step A2). When the control unit 1 determines that the operation in step A2 is not an operation of the aggregate printing button 33, but rather an operation of the normal printing button 32, the control unit 1 performs normal printing that is configured to respectively print the document data selected in step A1 (step A3), and the processing is completed.

Figure 8:
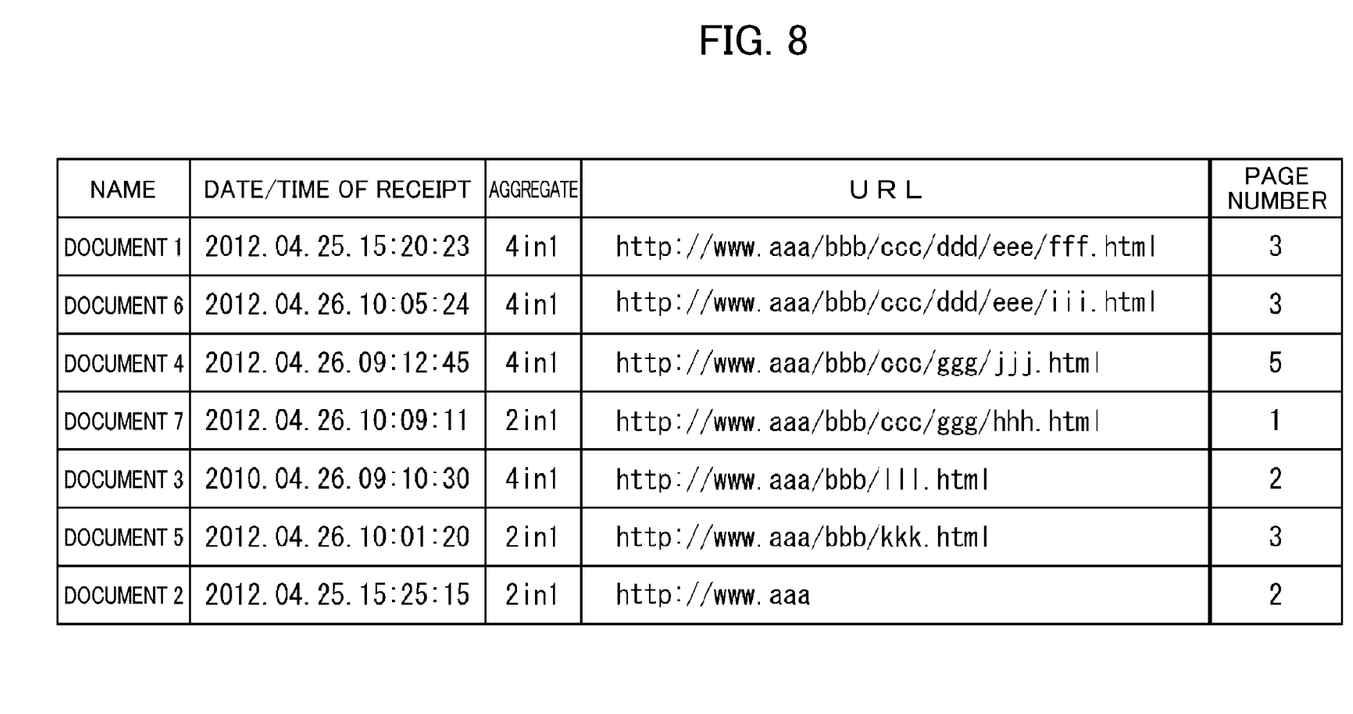
FIG. 8 illustrates an example of sorting of a document data list illustrated in FIG. 4.

When the control unit 1 determines that the operation in step A2 is an operation of the aggregate printing button 33, the aggregate processing unit 5 executes an aggregate printing process. Firstly, the aggregate processing unit 5 determines whether there is a plurality of document data selected in step A1 (step A4). When there is the plurality of document data selected in step A1 as shown in FIG. 4, the aggregate processing unit 5 starts execution of the aggregate printing process, and firstly, sorts the document data selected in the step A1 in response to the aggregate condition stored in the aggregate condition storing unit 7 (step A5). In step A4, the aggregate processing unit 5 sorts the selected document data in response to a direction (upper or lower level) of determining the association in item 1 of the aggregate condition setting screen 40 illustrated in FIG. 6. When the direction of determining the association in item 1 of the aggregate conditions setting screen 40 illustrated in FIG. 6 is set in the direction of upper level, the aggregate processing unit 5 sorts the document data in order of lower hierarchy. When the direction of determining the association in item 1 of the aggregate conditions setting screen 40 illustrated in FIG. 6 is set in the direction of lower level, the aggregate processing unit 5 sorts the document data in order of upper hierarchy. FIG. 8 illustrates an example of setting the direction of determining the association in item 1 of the aggregate condition setting screen 40 illustrated in FIG. 6 in a direction of upper level, and sorting the document data of "document 1" to "document 7" as illustrated in FIG. 4 in order of lower hierarchy.

Next, the aggregate processing unit 5 sets a variable "m" and a variable "n" to 1 (step A6), and determines the association of the document data for an $m^{th}$ document data and an $(m+1)^{th}$ document data based on the aggregate condition stored in the aggregate conditions storing unit 7 (step A7). An example will be described for determining the association of the $1^{st}$ document data and the $2^{nd}$ and subsequent document data as illustrated in FIG. 8, when items 1 to 3 of the aggregate condition setting screen 40 illustrated in FIG. 6 are set as the aggregate condition. When determining the item 1 of the aggregate condition, since the "URL" of "document 1" of the $1^{st}$ document data is at the sixth hierarchy, a comparison is performed until a hierarchy of three levels up of the "URL", that is to say, the character string of the third hierarchy to the fifth hierarchy. In this manner, it is determined that "document 6" of the $2^{nd}$ document data (coinciding with character strings of the third hierarchy to the fifth hierarchy) and the $3^{rd}$ and $4^{th}$ document data, "document 4" and "document 7" (coinciding with a character string of the third hierarchy) are determined to be associated with "document 1". However, the "URL" of the $3^{rd}$ and $4^{th}$ document data, "document 4" and "document 7", which is at the fifth hierarchy, does not satisfy item 2. Therefore it is determined that there is only an association between the $2^{nd}$ document data "document 6" and the $1^{st}$ document data "document 1".

Next, the aggregate processing unit 5 extracts $m^{th}$ document data and document data determined to have an association in step A7 as an $n^{th}$ document group (step A8). For example, in step A7, when it is determined that the $2^{nd}$ document data "document 6" has an association with the $1^{st}$ document data "document 1" in step A7, as illustrated in FIG. 9, the document data "document 1" and the "document 6" are extracted as a $1^{st}$ document group.

Next, the aggregate processing unit 5 determines whether extraction of all document data has been completed (step A9). It increments the variable "m" and the variable "n", respectively (step A10), and determines whether extraction of the $m^{th}$ document data has been completed as a document group in step A8 (step A11). When extraction of the document data has been completed as a document group in step A11, the aggregate processing unit 5 further increments the variable "m" (step A12), and the processing returns to step A11. In this manner, steps A11 and A12 are repeated until the variable "m" reaches a sequence number of the document data that is not extracted as a document group in step A8.

When extraction of the document data is not completed as a document group in step A11, the processing returns to the step A7, and the association of the document data that is not extracted as a document group is determined. For example, when the $1^{st}$ and the $2^{nd}$ document data are extracted, the association between the $3^{rd}$ document data and the $4^{th}$ and subsequent document data is determined. Since the "URL" of the $3^{rd}$ document data "document 4" that is illustrated in FIG. 8 is at the fifth hierarchy, a comparison is performed until three levels up of the "URL", that is to say, character strings at the second hierarchy to the fourth hierarchy. In this manner, the $4^{th}$ document data "document 7" (coinciding with character strings of the second hierarchy to fourth hierarchy) and the $5^{th}$ and $6^{th}$ document data, "document 3" and "document 5" (coinciding with a character string of the second hierarchy) are determined to be associated with the $3^{rd}$ document data "document 4". However, since the "URL" of the $5^{th}$ and $6^{th}$ document data, "document 3" and "document 5" is at the third hierarchy, it does not satisfy item 2. Accordingly, it is determined that only the $4^{th}$ document data "document 7" has an association with the $3^{rd}$ document data "document 4". In step A8, as illustrated in FIG. 9, the document data "document 4" and "document 7" are extracted as the $2^{nd}$ document group. In the same manner, since the "URL" of the $5^{th}$ document data "document 3" that is illustrated in FIG. 8 is at the third hierarchy, a comparison is performed until one level up of the "URL", that is to say, a character string at the second hierarchy. In this manner, the $6^{th}$ document data "document 5" (coinciding with character strings of the first hierarchy to second hierarchy) and the $7^{th}$ document data "document 2" (coinciding with a character string of the first hierarchy). However, since the "URL" of the $7^{th}$ document data "document 2" is at the first hierarchy, it does not satisfy item 2 and item 3. It is determined that only the $6^{th}$ document data "document 5" has an association with the $5^{th}$ document data "document 3". In step A8, as illustrated in FIG. 9, the document data "document 3" and "document 5" are extracted as the $3^{rd}$ document group. The $7^{th}$ document data "document 2" that finally remains without association is extracted as the $4^{th}$ document group as illustrated in FIG. 9.

Figure 9:
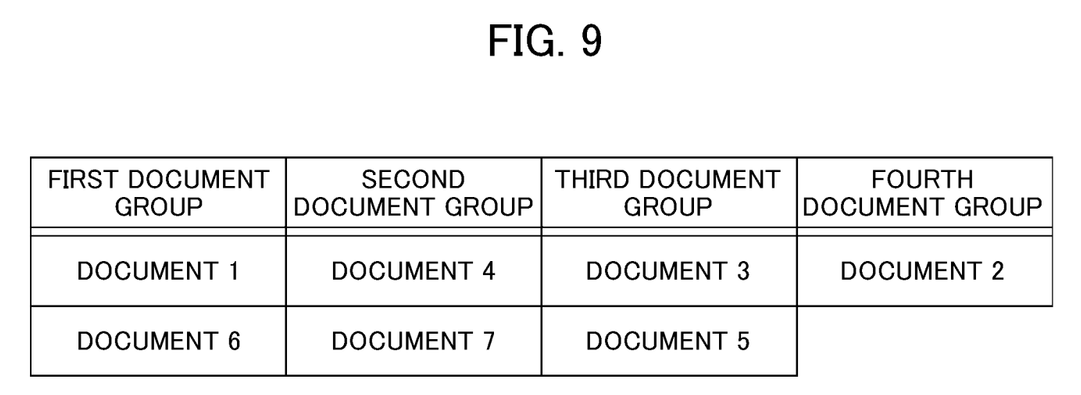
FIG. 9 illustrates an example of a document group that is extracted by aggregate printing processing performed by the aggregate processing unit illustrated in FIG. 3.

In step A9, as illustrated in FIG. 9, when the aggregate processing unit 5 determines that extraction of all document data is completed, and when the document data selected in step A4 is not a plural configuration but a singular configuration, the aggregate processing unit 5 sets the variable "n" to 1 (step A13), and performs aggregate printing of the $n^{th}$ document group (step A14). Next, the aggregate processing unit 5 determines whether aggregate printing of all document groups has been completed (step A15), and when aggregate printing of all document groups has been completed, the aggregate processing unit 5 finishes the aggregate printing process. When aggregate printing of all document groups has not been completed in step A15, the aggregate processing unit 5 increments the variable "n" (step A16), returns to step A14, and performs aggregate printing of the $n^{th}$ document group. In this manner, aggregate printing of all document groups extracted in step A8 is performed.

Figure 10:
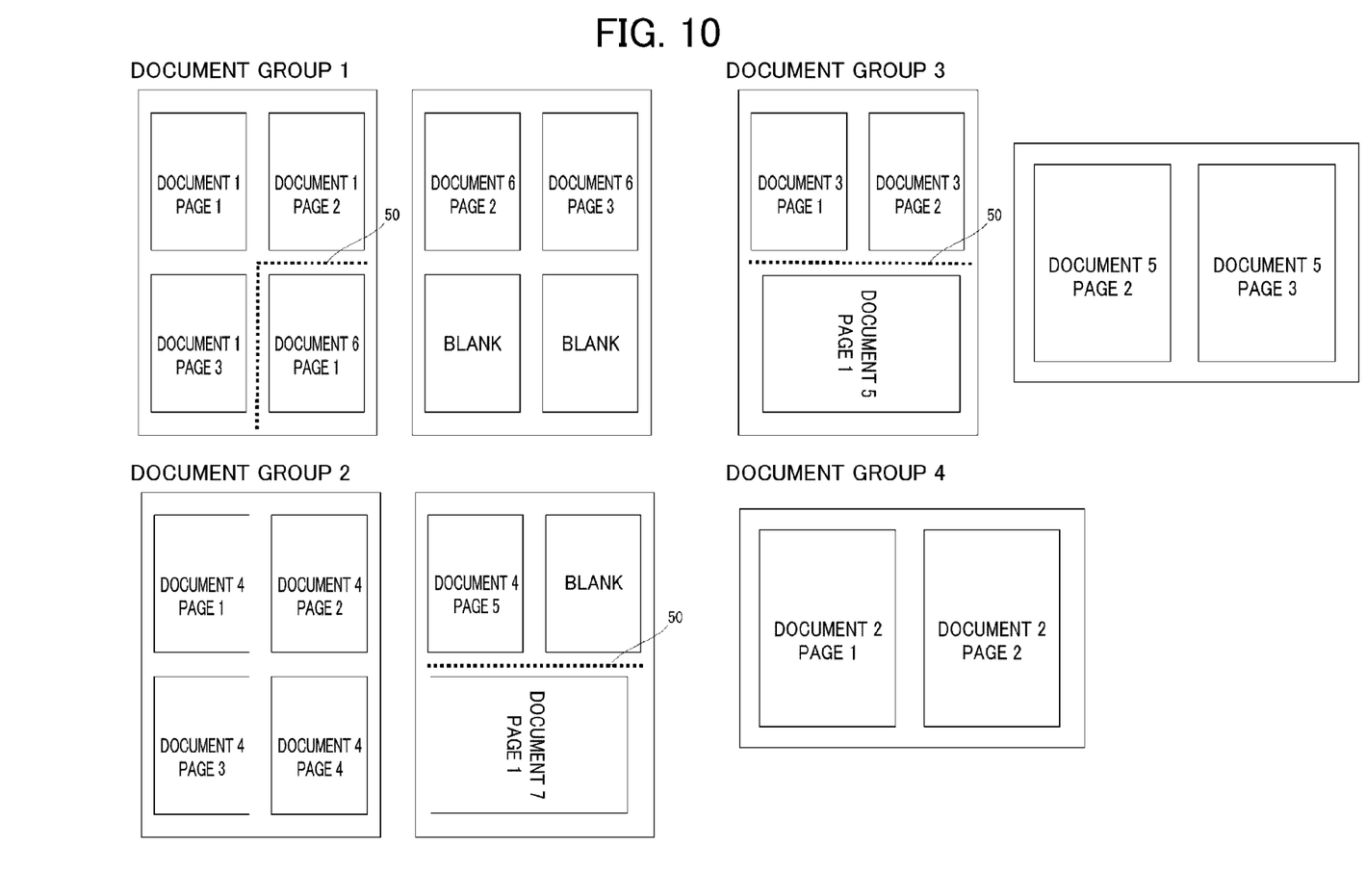
FIG. 10 illustrates an example of aggregate printing by aggregate printing processing performed by the aggregate processing unit illustrated in FIG. 3.

In aggregate printing in step A14, the document data of the $n^{th}$ document group is configured as a single group of continuous print data, and printing is performed in a printing configuration designated by "aggregate" of an attribute. When a plurality of document data is printed on a single recording paper P, the image processing unit 4 generates a ruled line as a notation 50 indicating a boundary between different document data. The ruled line generated by the image processing unit 4 is printed together with the document data by the image forming unit 150. FIG. 10 illustrates an example of four document groups illustrated in FIG. 9 that are respectively subjected to aggregate printing. In the $1^{st}$ document group, "document 1" and "document 6" are printed successively in an printing configuration of "4 in 1" as a single group of continuous print data, and a ruled line is printed as a notation 50 indicating a boundary between "document 1" and "document 6". In the $2^{nd}$ document group, "document 4" and "document 7" are configured as a single group of continuous print data, and after "document 4" that is printed in a "4 in 1" printing configuration, "document 7" is then printed in a "2 in 1" printing configuration, and a ruled line is printed as a notation 50 indicating a boundary between "document 4" and "document 7". In the $3^{rd}$ document group, "document 3" and "document 5" are configured as a single group of continuous print data, and after "document 3" that is printed in a "4 in 1" printing configuration, "document 5" is printed in a "2 in 1" printing configuration. A ruled line is printed as a notation 50 indicating a boundary between "document 3" and "document 5". Furthermore, in the $4^{th}$ document group, the "document 2" is printed in a "2 in 1" printing configuration. The present embodiment is configured to print in a printing configuration designated for each document data by "aggregate" of an attribute. However, the aggregate printing setting may be designated as a printing configuration (2 in 1, 4 in 1, or the like). In this case, it is possible to unify the printing configuration of the respective document data in the document group.

As described above, the present embodiment includes the document data storing unit 6 that stores a plurality of document data together with an attribute, the aggregate condition storing unit 7 that stores an aggregate condition defining the aggregate attribute, and the aggregate processing unit 5. The aggregate processing unit 5 configures the document data to be aggregated into a document group from the selected plurality of document data based on the aggregate condition, and executes aggregate printing of the document data in the document group as a single group of continuous print data. In this manner, the present embodiment enables extraction of document data to be collected as a single group of continuous print data based on the aggregate condition defining the aggregate attribute in the absence of a determination performed by a user. In the present embodiment, it is possible to collect a plurality of extracted document data as a single group of continuous print data and perform aggregate printing for it.

Furthermore, in the present embodiment, the attribute of the document data is the URL that indicates the location on the internet at which the document data is stored. In this manner, the present embodiment enables a simple definition of the aggregate condition by use of the hierarchical structure of the URL.

Furthermore, the present embodiment includes the image processing unit 4 that generates a notation that indicates a boundary between different document data when a plurality of document data is printed on a single sheet of recording paper P. In this manner, the present embodiment facilitates determination of the boundary of document data on the sheet of recording paper P that has been subjected to aggregate printing.

The present disclosure is not limited to the above embodiments. The embodiments may be suitably varied within the technical concept of the present disclosure.

The invention claimed is:

1. An image forming apparatus provided with an aggregate printing function configured to print a plurality of pages of document data on a single sheet of recording medium, the image forming apparatus comprising:
   a controller comprising a processor;
   a storage device comprising a document data storing unit and an aggregate condition unit; and
   an operation panel,
   wherein the processor is configured to:
   store a plurality of document data together with a hierarchical attribute thereof to the document data storing unit;
   display a document data list for the plurality of document data stored in the document data storing unit along with the hierarchical attribute on the operation panel;
   accept a selection of document data to be subjected to aggregate printing from the document data list through the operation panel;
   accept setting of hierarchical range and direction to be compared such that an aggregate condition that defines the attribute is established through the operation panel, the direction comprising a direction of upper level and a direction of lower level with respect to the hierarchical attribute;
   store the aggregate condition to the aggregate condition unit;
   extract document data to be aggregated as a document group from the selected document data based on the aggregate condition, by sorting the selected document data from a lower hierarchy to an upper hierarchy when the direction is set in the direction of upper level and sorting the selected document data from an upper hierarchy to a lower hierarchy when the direction is set in the direction of lower level; and
   execute aggregate printing of the document group according to an order of being extracted, and
   generate a notation indicating a boundary between different document data when a plurality of document data is printed as a single group of continuous print data on a single sheet of recording medium.

2. The image forming apparatus according to claim 1, wherein the attribute of the document data comprises a URL that indicates a location on an internet at which the document data is stored.

3. The image forming apparatus according to claim 2, wherein the aggregate condition comprises a character string of a hierarchy in the URL.

4. The image forming apparatus according to claim 3, wherein the aggregate condition comprises a direction and range of a hierarchy in the URL.

5. The image forming apparatus according to claim 4, wherein the aggregate condition comprises a level of a hierarchy in the URL.

6. The image forming apparatus according to claim 1, wherein the attribute of the document data comprises a folder structure in a peripheral device in which the document data is stored.

7. The image forming apparatus according to claim 6, wherein the aggregate condition comprises a character string of a hierarchy in the folder structure.

8. The image forming apparatus according to claim 7, wherein the aggregate condition comprises a direction and range of a hierarchy in the folder structure.

9. The image forming apparatus according to claim 8, wherein the aggregate condition is a level of a hierarchy in the folder structure.

10. The image forming apparatus according to claim 1, wherein the processor is further configured to print each document data in a printing configuration designated for each document data.

11. The image forming apparatus according to claim 1, wherein the processor is further configured to print each document data in a unified configuration for the document group.

12. The image forming apparatus according to claim 1, wherein the aggregate condition comprises determining an association among the selected document data based on a hierarchical level and setting a hierarchical level that is not included in determining the association.

* * * * *